(12) United States Patent
Kitagawa

(10) Patent No.: US 9,121,737 B2
(45) Date of Patent: Sep. 1, 2015

(54) INSTRUMENTAL DEVICE

(75) Inventor: Yuuichi Kitagawa, Shimada (JP)

(73) Assignee: Yazaki Corporation, Tokyo (JP)

( * ) Notice: Subject to any disclaimer, the term of this patent is extended or adjusted under 35 U.S.C. 154(b) by 164 days.

(21) Appl. No.: 13/882,222

(22) PCT Filed: Nov. 1, 2011

(86) PCT No.: PCT/JP2011/075167
§ 371 (c)(1),
(2), (4) Date: Apr. 29, 2013

(87) PCT Pub. No.: WO2012/060369
PCT Pub. Date: May 10, 2012

(65) Prior Publication Data
US 2013/0213294 A1    Aug. 22, 2013

(30) Foreign Application Priority Data
Nov. 1, 2010  (JP) ................. 2010-244949

(51) Int. Cl.
*G01D 11/28* (2006.01)
*B60K 37/02* (2006.01)
(Continued)

(52) U.S. Cl.
CPC ............ *G01D 11/28* (2013.01); *B60K 37/02* (2013.01); *G01D 7/00* (2013.01);
(Continued)

(58) Field of Classification Search
CPC  F21Y 2101/02; F21S 48/145; F21S 48/1388; H01L 2924/0002; H01L 33/60; G01D 11/28; G01D 7/00; B60K 37/02; B60K 2350/203; B60K 2350/2069; B60K 2350/408; G09F 2013/0422; G09F 2013/044; G09F 2013/145; B60Q 3/002; B60Q 1/26; B60Q 1/17

USPC ......... 116/281, 282, 283, 284, 285, 286, 287, 116/288; 362/26, 27, 28, 29, 30
See application file for complete search history.

(56) References Cited

U.S. PATENT DOCUMENTS 3,486,019 A  * 12/1969 Bryant et al. ................. 362/548
6,595,667 B1 *  7/2003 Obata ........................... 362/489
(Continued)

FOREIGN PATENT DOCUMENTS

JP         59-20111 U     2/1984
JP          5-33020 U     4/1993
(Continued)

OTHER PUBLICATIONS

Office Action mailed Jul. 8, 2014, issued for the corresponding Japanese patent application No. 2010-244949 and English translation thereof.
(Continued)

*Primary Examiner* — Bao Q Truong
*Assistant Examiner* — Fatima Farokhrooz
(74) *Attorney, Agent, or Firm* — Locke Lord LLP

(57) ABSTRACT

An instrumental device includes: a dial plate formed in a circular plate shape, and on which indexes indicating a condition of a mobile object are arranged in a circumferential direction of the dial plate; a case provided with a concave formed in a concave groove shape along the indexes, and to which the dial plate is attached so as to cover an opening of the concave; and a light source provided on a rear side of the dial plate in the concave opposite to the index, and emitting light toward the index. The case is provided with a light shield interposed between the index and the light source and facing the light source. At least a part of an outer periphery 36 of the light shield is formed in an arc shape so that a distance from an outer periphery of the concave is constant.

15 Claims, 7 Drawing Sheets

(51) Int. Cl.
*G01D 7/00* (2006.01)
*G09F 13/04* (2006.01)
*G09F 13/14* (2006.01)

(52) U.S. Cl.
CPC .. *B60K 2350/203* (2013.01); *B60K 2350/2069* (2013.01); *B60K 2350/408* (2013.01); *G09F 2013/044* (2013.01); *G09F 2013/0422* (2013.01); *G09F 2013/145* (2013.01)

(56) References Cited

U.S. PATENT DOCUMENTS

2004/0212976 A1* 10/2004 Mikami ........................ 362/23
2007/0157745 A1* 7/2007 Takato et al. ................ 73/866.3
2007/0247856 A1* 10/2007 Wang et al. .................. 362/297

FOREIGN PATENT DOCUMENTS

| | | |
|---|---|---|
| JP | 2004-325106 A | 11/2004 |
| JP | 2005-257496 A | 9/2005 |
| JP | 2005-345548 A | 12/2005 |
| JP | 2006-047128 A | 2/2006 |
| JP | 2006-113004 A | 4/2006 |
| JP | 2011-099765 A | 5/2011 |

OTHER PUBLICATIONS

International Search Report dated Dec. 6, 2011, issued for PCT/JP2011/075167.

* cited by examiner

INSTRUMENTAL DEVICE

TECHNICAL FIELD

This invention relates to an instrumental device mounted on a mobile object such as vehicle.

BACKGROUND ART

As the above instrumental device, for example, as shown in FIG. 9, a meter 101 mounted on a vehicle or the like as a mobile object is known (for example, see PTL 1). The conventional meter 101 shown in FIG. 9 includes: a dial plate (not shown) formed in a circular plate shape, and on which indexes (not shown) indicating a condition of the mobile object are arranged in a circumferential direction thereof; and a case 103 provided with a concave 131 formed in a concave groove shape along the indexes, and to which the dial plate is attached so as to cover an opening of the concave 131; and a light source 104 provided on a rear side of the dial plate in the concave 131 opposite to the index, and emitting light toward the index. Further, FIG. 9 shows the conventional meter 101 of which dial plate (not shown) is removed. A chain line in FIG. 9 shows a range L to which the light from the light source 104 is applied.

The case 103 is provided with a light shield 132 formed in a circular shape in a plan view and interposed between the index and the light source 104.

CITATION LIST

Patent Literature

[PTL 1]
JP, A, 2006-47128

SUMMARY OF INVENTION

Technical Problem

However, the above conventional meter 101 has a problem described below. Namely, because in the conventional meter 101, the light shield 132 is formed in a circular shape in plan view, the amount of light from the light source 104 is large at a point A where a distance from the light shield 132 to an outer periphery of the concave 131 of the range L to which the light from the light source 104 is applied is short. The amount of light is gradually reduced as it is moved from the point A toward a point B where the distance from the light shield 132 to the outer periphery of the concave 131 is long. Therefore, uneven brightness is generated in the circumferential direction of the concave 131. Therefore, there is a problem that the uneven brightness is generated at the index seen through the dial plate. Further, for canceling the uneven brightness, dimming print may be printed on the dial plate. However, degree of the print should be examined, and man-hour may be increased.

Accordingly, an object of the present invention is to provide an instrumental device able to improve visibility by homogenizing the mount of light emitted from the light source at the index seen through the dial plate.

Solution to Problem

For attaining the object, according to the invention claimed in claim 1, there is provided an instrumental device comprising:

a dial plate formed in a circular plate shape, and on which indexes indicating a condition of a mobile object are arranged in a circumferential direction of the dial plate;

a case provided with a concave formed in a concave groove shape along the indexes, and to which the dial plate is attached so as to cover an opening of the concave; and a light source provided on a rear side of the dial plate in the concave, opposite to the index, and emitting light toward the index, wherein the case is provided with a light shield interposed between the index and the light source and facing the light source, and wherein at least a part of an outer periphery of the light shield is formed in an arc shape so that a distance from an outer periphery of the concave is constant.

According to the invention claimed in claim 2, there is provided the instrumental device as claimed in claim 1, wherein the index is positioned at an outside or an inside of the opening, wherein an inner peripheral wall of the concave is so provided as to reflect light from the light source, wherein the inner peripheral wall is provided with a first inclined wall inclined in a direction approaching the dial plate as extended outward, and a second inclined wall inclined in a direction approaching the dial plate as extended inward, and wherein an inclination of one wall provided with the index of the first and second inclined walls is formed smaller than an inclination of the other wall away from the index.

According to the invention claimed in claim 3, there is provided the instrumental device as claimed in claim 1 or 2, wherein an inner periphery of the light shield is formed in an arc shape projecting outward.

According to the invention claimed in claim 4, there is provided the instrumental device as claimed in any one of claims 1 to 3, wherein the outer periphery of the light shield is provided with a round portion of which distance from the outer periphery of the concave is longer as extended toward an end of the outer periphery of the light shield.

According to the invention claimed in claim 5, there is provided the instrumental device as claimed in any one of claims 2 to 4, further comprising: a pair of legs configured to connect the light shield and the concave and to reflect the light from the light source to the first or second inclined wall, said legs respectively projected outward from both ends of the outer periphery of the light shield.

Advantageous Effects of Invention

According to the invention claimed in claim 1, the instrumental device comprising: a dial plate formed in a circular plate shape, and on which indexes indicating a condition of a mobile object are arranged in a circumferential direction thereof a case provided with a concave formed in a concave groove shape along the indexes, and to which the dial plate is attached so as to cover an opening of the concave; and a light source provided on a rear side of the dial plate in the concave opposite to the index, and emitting light toward the index, wherein the case is provided with a light shield interposed between the index and the light source and facing the light source, and wherein at least a part of an outer periphery of the light shield is formed in an arc shape so that a distance from an outer periphery of the concave is constant. Therefore, the amount of light emitted from the light source is homogenized in a circumferential direction of the concave at the outer periphery of the concave spaced in a constant distance from the outer periphery of the light shield. Therefore, the amount of light is homogenized at the index seen through the dial plate, thereby the instrumental device able to improve visibility can be provided.

According to the invention claimed in claim 2, the index is positioned at an outside or an inside of the opening, an inner peripheral wall of the concave is so provided as to reflect the light from the light source, the inner peripheral wall is provided with a first inclined wall inclined in a direction approaching the dial plate as extended outward, and a second inclined wall inclined in a direction approaching the dial plate as extended inward, and an inclination of one wall provided with the index of the first and second inclined walls is formed smaller than an inclination of the other wall away from the indexes. Therefore, the light from the light source is reflected on the other wall away from the index, and emitted toward the index. Therefore, the mount of light emitted toward the index is increased, and the index is further illuminated. Thereby, the visibility of the instrumental device is improved.

According to the invention claimed in claim 3, an inner periphery of the light shield is formed in an arc shape projecting outward. Therefore, a distance from the light source to the inner periphery of the light shield is reduced as extended toward the center of the inner periphery. Therefore, the amount of light reflected toward the index by the first or second inclined wall provided away from the index is increased. Thereby, the index is further illuminated, and the visibility of the instrumental device is further improved.

According to the invention claimed in claim 4, the outer periphery of the light shield is provided with a round portion of which distance from the outer periphery of the concave is longer as extended toward an end of the outer periphery of the light shield. Therefore, the distance from the outer periphery of the concave to the outer periphery of the light shield is longer as extended toward an end (round portion) of the outer periphery. Therefore, among the range to which the light from the light source is emitted, the mount of light emitted toward a position away from the light source is increased. Therefore, the amount of light emitted from the light source is further homogenized in the circumferential direction of the concave at the outer periphery of the concave, and the visibility of the instrumental device is further improved.

According to the invention claimed in claim 5, the instrumental device further comprising: a pair of legs configured to connect the light shield and the concave and to reflect the light from the light source to the first or second inclined wall, said legs respectively projected outward from both ends of the outer periphery of the light shield. Therefore, the light from the light source is emitted within a range of straight lines connecting the pair of legs and the light source at the opening where the index is positioned. Namely, a range where the light from the light source is emitted is determined by an angle between the pair of legs with respect to the center light source. Therefore, the range where the light from the light source is emitted is determined by an easy operation of setting an angle between the pair of legs with respect to the center light source.

BRIEF DESCRIPTION OF DRAWINGS

FIG. 1 is a front view showing a meter according to a first embodiment of the present invention.
FIG. 2 is a sectional view taken on line I-I in FIG. 1.
FIG. 3 is a front view showing the meter shown in FIG. 1 of which dial plate is removed.

FIG. 4 is an enlarged partially sectional perspective view showing a main part of FIG. 3.
FIG. 5 is an enlarged sectional view showing a main part of FIG. 2.
FIG. 6 is an enlarged front view showing a main part of a meter according to a second embodiment of the present invention.
FIG. 7 is a further enlarged front view showing a main part shown in FIG. 6.
FIG. 8 is a front view showing the meter shown in FIG. 6 of which dial plate is removed.
FIG. 9 is a front view showing a conventional meter.

DESCRIPTION OF EMBODIMENTS (First Embodiment)

A tachometer (hereinafter, referred to as meter) as an instrumental device according to a first embodiment of the present invention will be explained with reference to FIGS. 1 to 5.

Figure 1:
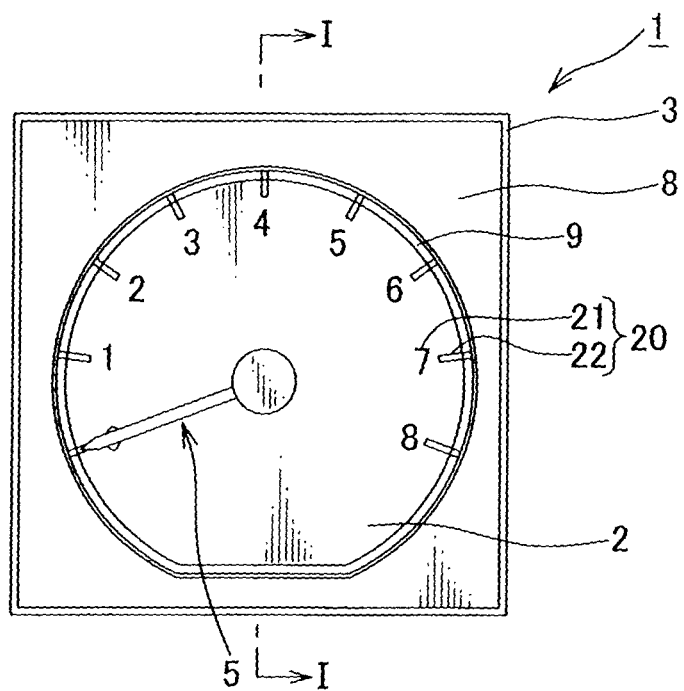
[FIG. 1]
Figure 2:
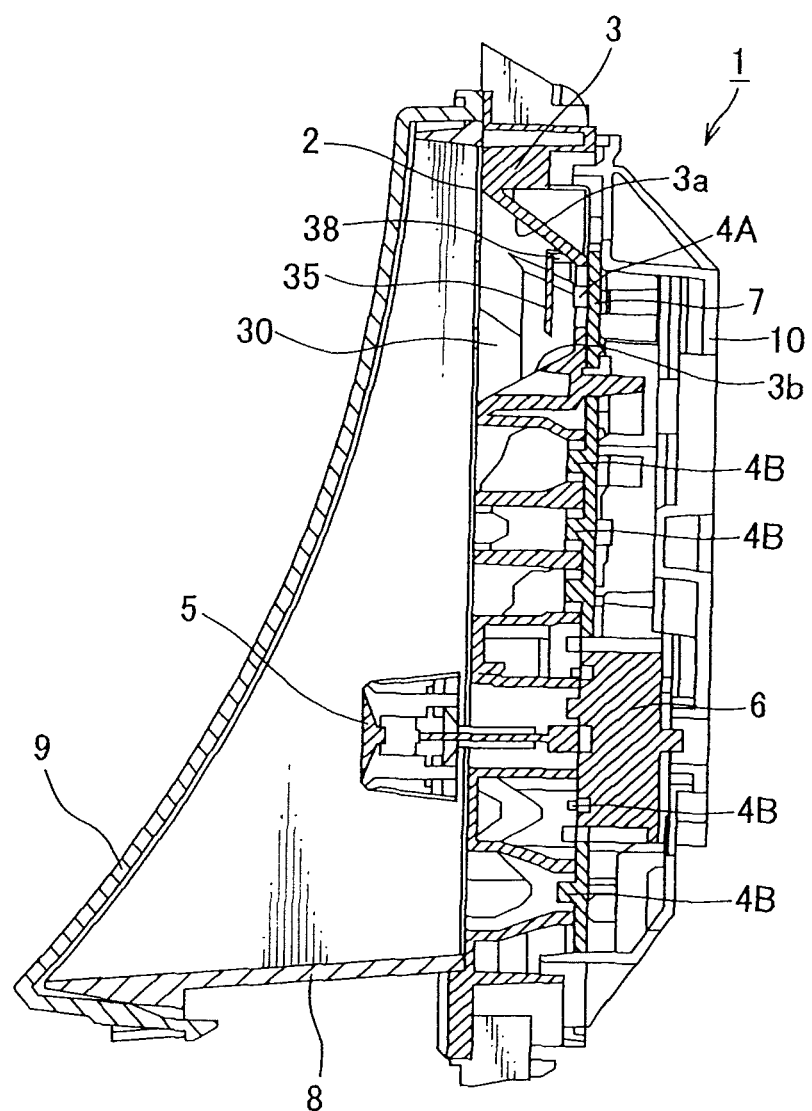
[FIG. 2]

As shown in FIGS. 1 and 2, the meter 1 includes: a dial plate 2 formed in a circular plate shape, and on which an index 20 indicating a condition of a mobile object is arranged in a circumferential direction of the dial plate 2; a case 3 provided with a concave 30 formed in a concave groove shape along the indexes 20, and to which the dial plate 2 is attached so as to cover an opening of the concave 30; a light source 4A provided on a rear side of the dial plate 2 in the concave 30 opposite to the index 20, and emitting light toward the index 20; a pointer 5; an inner mechanism 6; a wiring board 7; and a bezel 8. While the dial plate 2, the light source 4A, the pointer 5, the inner mechanism 6, the wiring board 7, and the bezel 8 are received in the case 3, the meter 1 further includes: a front glass 9 covering a driver side (hereinafter referred to as front side) of the case 3; and a rear cover 10 covering a rear side of the case 3 opposite to the front side.

Figure 5:
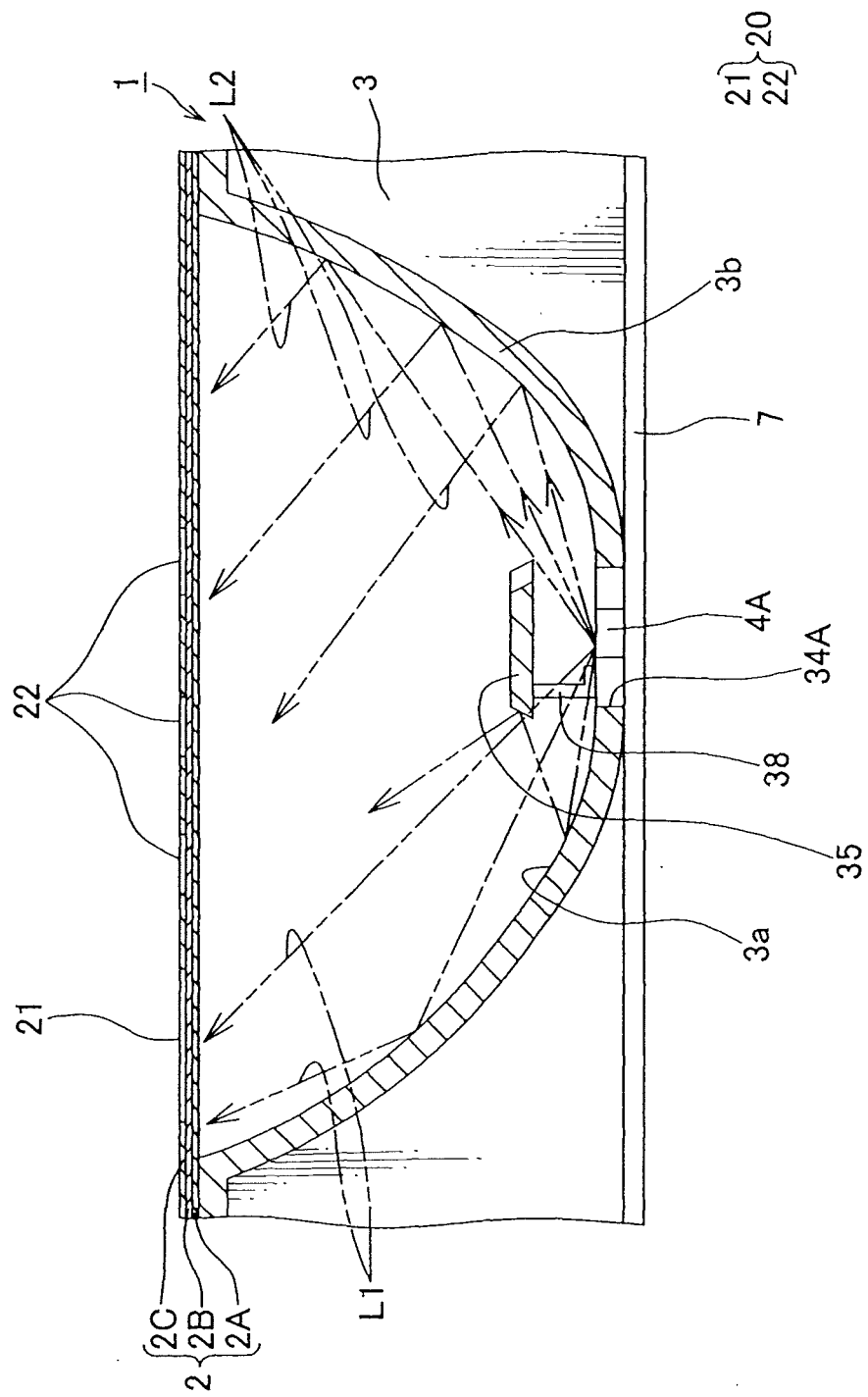
[FIG. 5]

As shown in FIGS. 1 and 5, the dial plate 2 is composed of a transparent substrate 2B, a design displaying layer 2C disposed at a front side of the transparent substrate 2B, the index 20 disposed at a rear side of the transparent substrate 2B, and a light shield layer 2A from which a later-described design portion (not shown) is removed. Further, a pointer-insertion hole 23 (shown in FIG. 3) penetrating the dial plate 2 for attaching the pointer 5 is provided on the center of the dial plate 2.

The indexes 20 are arranged at regular intervals along a circumferential direction of the dial plate 2. Further, the indexes 20 are positioned at an outside (namely, later-described first inclined wall 3a side) of an opening of the concave 30. Further, the index 20 includes: a graduation 21 for indicating a condition of a mobile object; and a numeral 22 provided at a position corresponding to the graduation 21.

Further, the dial plate 2 is provided with a plurality of design portions (not shown) for indicating a condition of the mobile object. These design portions are provided between the indexes 20 and the pointer-insertion hole 23 along a circumferential direction of the dial plate 2. Further, in FIG. 1, these design portions are omitted.

Figure 3:
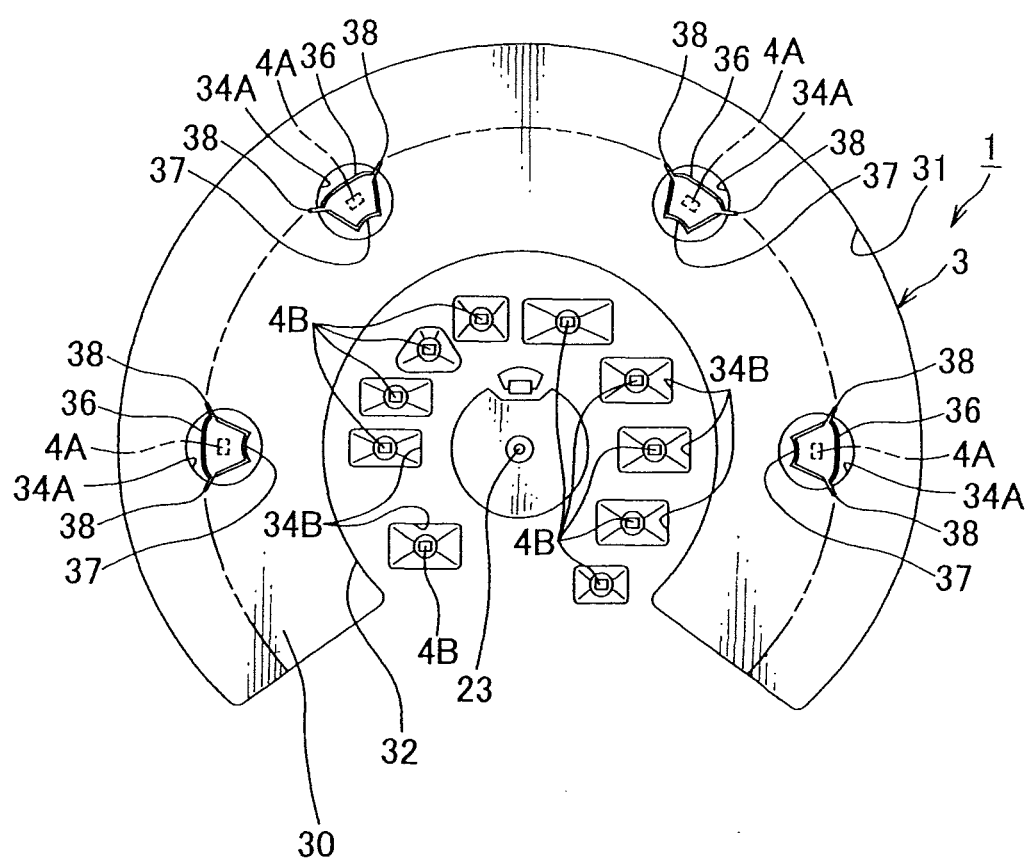
[FIG. 3]

The case 3 is provided at a rear side of the dial plate 2. Further, as shown in FIGS. 3 and 4, the case 3 is provided with a light shield 35 interposed between the concave 30, the index 20 and the light source 4A, and opposite to the light source 4A, and a leg 38 connecting the light shield 35 and the concave 30.

Figure 4:
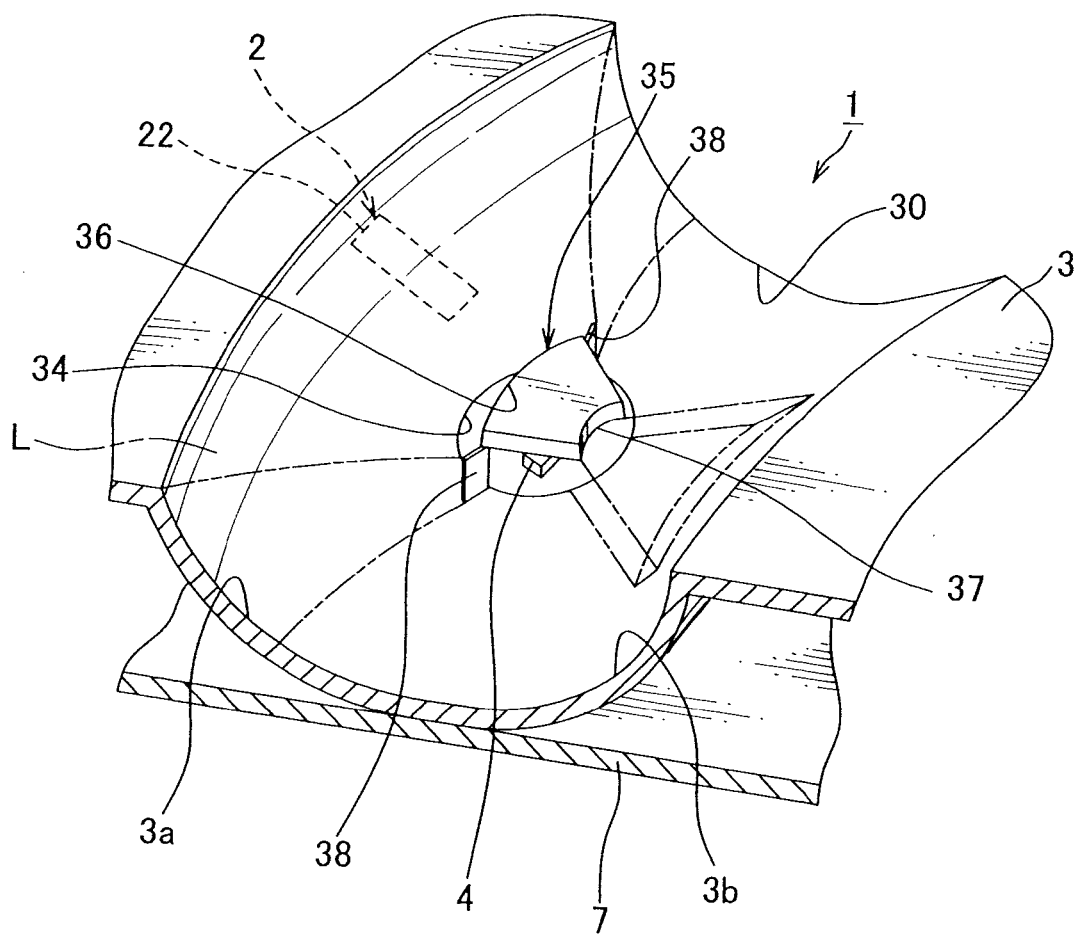
[FIG. 4]

As shown in FIG. 4, an inner peripheral wall of the concave 30 is so provided as to reflect the light from the light source 4A. The inner peripheral wall of the concave 30 is provided with a first inclined wall 3a inclined in a direction approaching the dial plate 2 as extended outward, and a second inclined wall 3b inclined in a direction approaching the dial plate 2 as extended inward. Further, an inclination of the second inclined wall 3b is larger than an inclination of the first inclined wall 3a so that the light reflected by the second inclined wall 3b emits toward the index 20. Further, as shown in FIG. 3, an outer periphery 31 of the concave 30 (namely, outer edge of the first inclined wall 3a) and an inner periphery 32 of the concave 30 (namely, inner edge of the second inclined wall 3b) are formed in an arc shape coaxial with the pointer-insertion hole 23.

Further, a plurality of light-source openings 34A penetrating the case 3 for inserting the index-illuminating light sources 4A attached to a later-described wiring board 7 is provided between the first inclined wall 3a and the second inclined wall 3b.

Further, a plurality of light-source openings 34B penetrating the case 3 for inserting later-described design-illuminating light sources 4B attached to the wiring board 7 is provided between the concave 30 and the pointer-insertion hole 23.

The light shield 35 is formed in a plate shape. Further, an outer periphery 36 of the light shield 35 is formed in an arc shape so that a distance from the outer periphery 31 of the concave 30 is constant throughout a whole periphery of the outer periphery 36. Further, an inner periphery 37 of the light shield 35 is formed in an arc shape projecting outward. Namely, a distance from the light source 4A to the inner periphery 37 of the light shield 35 is reduced as extended toward the center of the inner periphery 37.

The leg 38 is formed in a plate shape. A pair of legs 38 is respectively projected outward from both ends of the outer periphery 36 of the light shield 35.

Further, an outer surface of the leg 38 is so provided as to reflect the light from the index-illuminating light sources 4A. Thus, the light reflected by the leg 38 is reflected by the first or second inclined wall 3a, 3b and emitted toward the index 20 positioned at an outside of the opening.

Further, as shown in FIG. 4, the light emitted from the index-illuminating light sources 4A, reflected by the leg 38, and then reflected by the first or second inclined wall 3a, 3b is emitted within a range L of straight lines connecting the pair of legs 38 and the light source 4A at the opening where the index 20 is positioned. Namely, the range L of straight lined connecting the pair of legs 38 and the index-illuminating light sources 4A is a range where the light from the index-illuminating light sources 4A is emitted. Therefore, the range L where the light from the index-illuminating light sources 4A is emitted is determined by an angle between the pair of legs 38 with respect to the center index-illuminating light sources 4A.

Further, the meter 1 is provided with a plurality of design-illuminating light sources 4B for illuminating the design portions. These design-illuminating light sources 4B are provided at a rear side of the dial plate 2 and facing the design portions, and emit light toward the design portions.

As shown in FIGS. 1 and 2, the pointer 5 is inserted into the pointer-insertion hole 23 of the dial plate 2, and arranged at a front side of the dial plate 2. Further, the pointer 5 is driven by the inner mechanism 6. Thus, the pointer 5 indicates the index 20 corresponding to a condition of the mobile object.

The wiring board 7 is provided at a rear side of the dial plate 2. The inner mechanism 6, the index-illuminating light sources 4A, and the design-illuminating light sources 4B are mounted on the wiring board 7.

Next, goings of the light L1, L2 emitted from the index-illuminating light sources 4A of the meter 1 will be explained with reference to FIG. 5.

First, the light L1 emitted outward of the light shield 35 from the index-illuminating light sources 4A is reflected by the first inclined wall 3a, and emitted outside of the opening where the index 20 is positioned. Further, after the light L1 is reflected by the first inclined wall 3a, the light L1 is further reflected by the light shield 35, and emitted outside of the opening where the index 20 is positioned.

Further, an outer periphery 36 of the light shield 35 is formed in an arc shape throughout a whole periphery so that a distance from an outer periphery 31 of the concave 30 is constant. Therefore, the amount of light L1 emitted toward an outside of the opening where the index 20 is positioned is homogenized in a circumferential direction of the concave 30 at the outer periphery 31 of the concave 30 spaced in a constant distance from the outer periphery 36 of the light shield 35.

Further, the light L1 emitted outward of the light shield 35 from the index-illuminating light sources 4A is reflected by the leg 38 and then reflected by the first or second inclined wall 3a, 3b, and emitted toward the index 20 positioned at an outside of the opening. Therefore, the amount of the light emitted toward the index 20 is increased.

Further, the light L2 emitted inward of the light shield 35 from the index-illuminating light sources 4A is reflected by the second inclined wall 3b, and emitted toward an outside of the opening where the index 20 is positioned. Because the inner periphery of the light shield 35 is formed in an arc shape so that a distance from the index-illuminating light sources 4A is reduced as extended toward the center of the inner periphery, the amount of light emitted toward the index 20 is increased.

Thus, the light L1, L2 received in the dial plate 2 goes through a portion where the light shield layer 2A is not formed (namely, the index 20 and the design portion) and is emitted to a front side. Thus, a driver can see the illuminated index 20 and the illuminated design portion formed on the dial plate 2.

According to the above embodiment, the meter 1 as the instrumental device includes: the dial plate 2 formed in a circular plate shape, and on which the index 20 indicating a condition of a mobile object is arranged in a circumferential direction of the dial plate 2; the case 3 provided with the concave 30 formed in a concave groove shape along the indexes 20, and to which the dial plate 2 is attached so as to cover an opening of the concave 30; and the index-illuminating light sources 4A as the light source provided on a rear side of the dial plate 2 in the concave 30 opposite to the index 20, and emitting light toward the index 20. The case 3 is provided with a light shield 35 interposed between the index 20 and the light source 4A and facing the light source 4A. At least a part of an outer periphery 36 of the light shield 35 is formed in an arc shape so that a distance from the outer periphery 31 of the concave 30 is constant. Therefore, the amount of light emitted from the index-illuminating light sources 4A is homogenized in a circumferential direction of the concave 30 at the outer periphery 31 of the concave 30 spaced in a constant distance from the outer periphery 36 of the light shield 35. Therefore, the amount of light is homogenized at the index 20 seen through the dial plate 2, thereby the meter 1 able to improve visibility can be provided.

Further, the index 20 is positioned at an outside of the opening, an inner peripheral wall of the concave 30 is so provided as to reflect the light from the index-illuminating light sources 4A, the inner peripheral wall is provided with a first inclined wall 3a inclined in a direction approaching the dial plate 2 as extended outward, and a second inclined wall 3b inclined in a direction approaching the dial plate 2 as extended inward, and an inclination of one wall provided with the index 20 of the first and second inclined walls 3a, 3b is formed smaller than an inclination of the other wall away from the index 20. Therefore, the light from the index-illuminating light sources 4A is reflected on the other wall away from the index 20, and emitted toward the index 20. For example, when the index 20 is positioned at an outside of the opening of the concave 30, the first inclined wall 3a is provided at the side where the index 20 is provided, and the second inclined wall 3b is provided at the side away from the index 20. Because the inclination of the first inclined wall 3a is formed smaller than the inclination of the second inclined wall 3b, the light emitted inward of the light shield 35 is reflected by the second inclined wall 3b, and emitted toward the outside of the opening where the index 20 is positioned. Therefore, the mount of light emitted toward the index 20 is increased, and the index 20 is further illuminated. Thereby, the visibility of the meter 1 is improved.

Further, an inner periphery 37 of the light shield 35 is formed in an arc shape projecting outward. Therefore, a distance from the index-illuminating light sources 4A to the inner periphery 37 of the light shield 35 is reduced as extended toward the center of the inner periphery 37. Therefore, the amount of light reflected toward the index 20 by the second inclined wall 3b provided away from the index 20 is increased. Thereby, the index 20 is further illuminated, and the visibility of the meter 1 is further improved.

Further, the meter 1 further includes: a pair of legs 38 configured to connect the light shield 35 and the concave 30 and to reflect the light from the index-illuminating light sources 4A to the first or second inclined wall 3a, 3b, said legs 38 respectively projected outward from both ends of the outer periphery 36 of the light shield 35. Therefore, the light from the index-illuminating light sources 4A is emitted within a range L of straight lines connecting the pair of legs 38 and the index-illuminating light sources 4A at the opening where the index 20 is positioned. Namely, a range L where the light from the index-illuminating light sources 4A is emitted is determined by an angle between the pair of legs 38 with respect to the center index-illuminating light sources 4A. Therefore, the range L where the light from the index-illuminating light sources 4A is emitted is determined by an easy operation of setting an angle between the pair of legs 38 with respect to the center index-illuminating light sources 4A.

Incidentally, according to the above embodiment, an outer periphery 36 of the light shield 35 is formed in an arc shape so that a distance from the outer periphery 31 of the concave 30 is constant throughout a whole periphery of the outer periphery 36. However, the present invention is not limited to this. At least a part of an outer periphery 36 of the light shield 35 may be formed in an arc shape so that a distance from an outer periphery 31 of the concave 30 is constant.

Further, according to the above embodiment, the index 20 is positioned at an outside of the opening of the concave 30, and an inclination of the first inclined wall 3a which is provided at the side where the index 20 is provided is formed smaller than an inclination of the second inclined wall 3b. However, the present invention is not limited to this. The index 20 may be positioned at an inside of the opening of the concave 30, and an inclination of the second inclined wall 3b which is provided at a side where the index 20 is provided may be formed smaller than an inclination of the first inclined wall 3a. The index 20 is positioned at an inside of the opening. An inner peripheral wall of the concave 30 is so provided as to reflect the light from the index-illuminating light sources 4, the inner peripheral wall is provided with a first inclined wall 3a inclined in a direction approaching the dial plate 2 as extended outward, and a second inclined wall 3b inclined in a direction approaching the dial plate 2 as extended inward, and an inclination of one wall provided with the index 20 of the first and second inclined walls 3a, 3b is formed smaller than an inclination of the other wall away from the index 20. Therefore, the light emitted outward of the light shield 35 is reflected by the first inclined wall 3a, and emitted toward the inside of the opening where the index 20 is positioned. Therefore, the mount of light emitted toward the index 20 is increased, and the index 20 is further illuminated. Thereby, the visibility of the meter 1 is improved.

(Second Embodiment)

Figure 6:
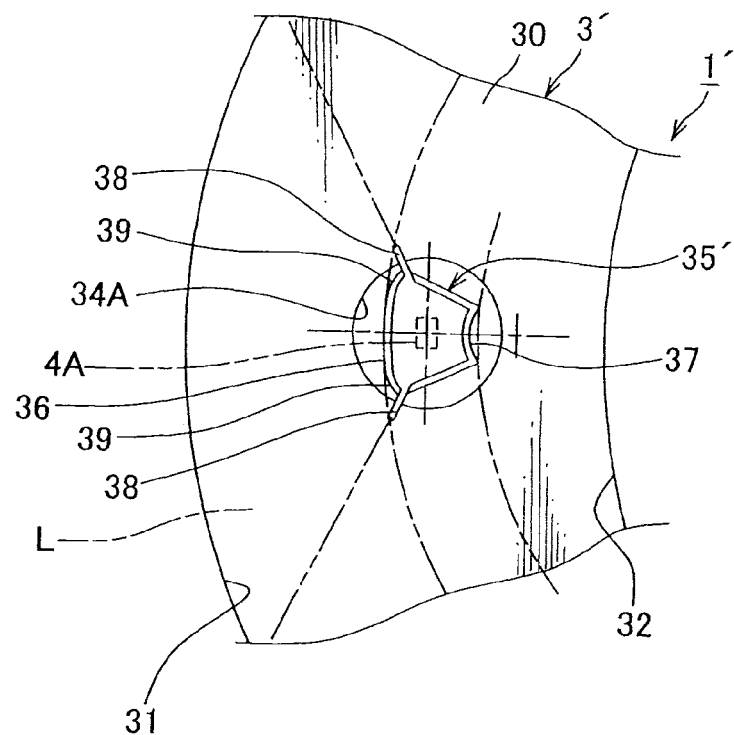
[FIG. 6]
Figure 7:
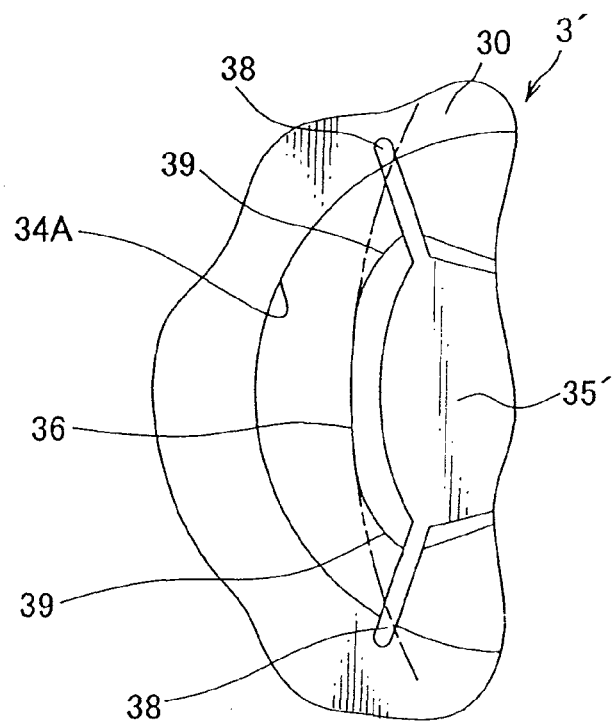
[FIG. 7]

A meter 1' according to a second embodiment of the present invention will be explained with reference to FIGS. 6 to 8. Further, in FIGS. 6 to 8, the same components as the above first embodiments are denoted by the same reference signs, and the explanation is omitted.

The meter 1' includes: a dial plate 2 formed in a circular plate shape, and on which indexes 20 indicating a condition of a mobile object are arranged in a circumferential direction of the dial plate 2; a case 3 provided with a concave 30 formed in a concave groove shape along the indexes 20, and to which the dial plate 2 is attached so as to cover an opening of the concave 30; a light source 4A provided on a rear side of the dial plate 2 in the concave 30 opposite to the index 20, and emitting light toward the index 20; a pointer 5; an inner mechanism 6; a wiring board 7; and a bezel 8.

The case 3 is provided at a rear side of the dial plate 2. Further, as shown in FIGS. 3 and 4, the case 3 is provided with a light shield 35' interposed between the concave 30, the index 20 and the light source 4A, and opposite to the light source 4A, and a leg 38 connecting the light shield 35' and the concave 30.

The light shield 35' is formed in a plate shape. Further, as shown in FIGS. 6 and 7, a center portion of the outer periphery 36 of the light shield 35' is formed in an arc shape so that a distance from an outer periphery of the concave is constant. The outer periphery 36 of the light shield 35' is provided with a round portion 39 of which distance from the index-illuminating light sources 4A is longer as extended toward an end of the outer periphery 36.

Figure 8:
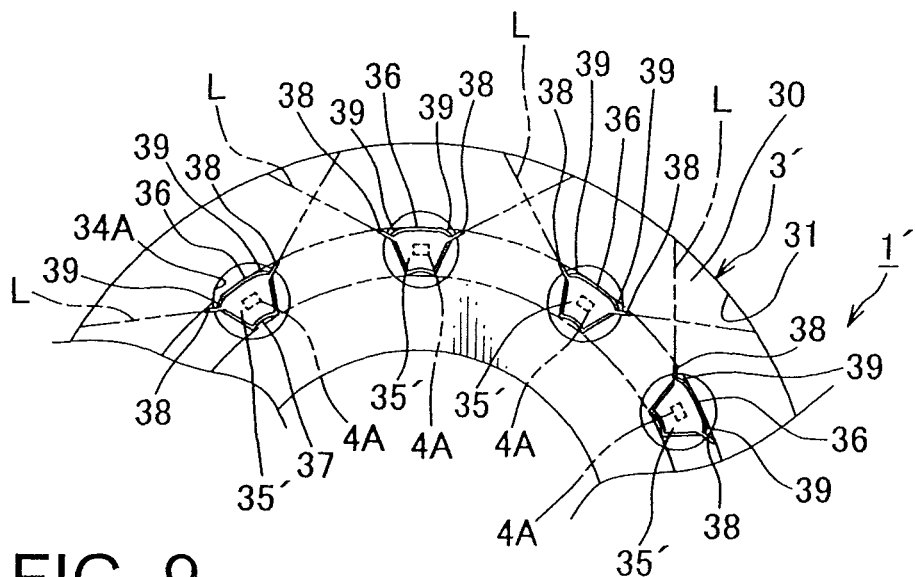
[FIG. 8]
Figure 9:
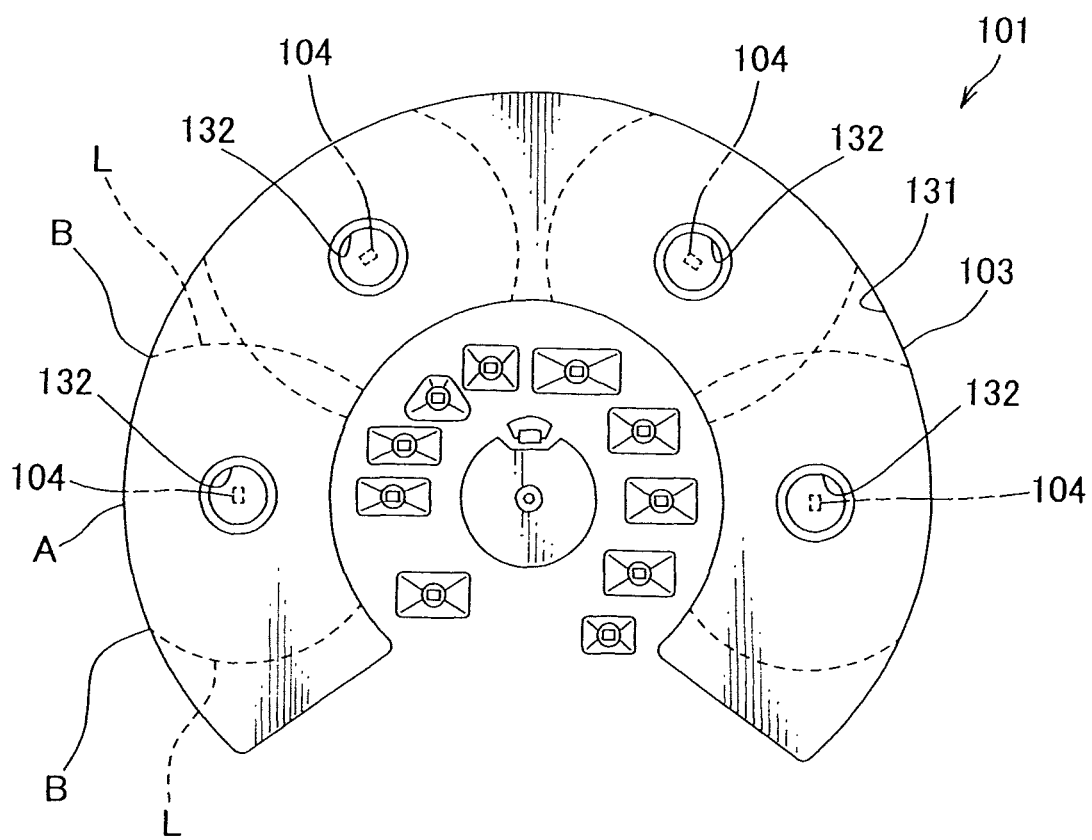
[FIG. 9]

Further, as shown in FIG. 8, in a range L to which the light from the index-illuminating light sources 4A is emitted, the leg 38 is so provided that ends of the ranges L in a circumferential direction are overlapped with each other. (Namely, an angle between a pair of legs 38 with respect to the center index-illuminating light sources 4A is determined so that the ends of the ranges L in the circumferential direction are overlapped with each other.)

To explain in detail, the amount of light from the index-illuminating light sources 4A is reduced as extended away from the outer periphery 36 of the light shield 35'. Therefore, in the range L to which the index-illuminating light sources 4A is emitted, the amount of the light from the index-illuminating light sources 4A is reduced as extended toward the end from the center portion in the circumferential direction. Therefore, in the range L to which the index-illuminating light sources 4A is emitted, the pair of legs 38 is so provided that the ends of the ranges L in the circumferential direction where the amount of light from the index-illuminating light sources 4A is reduced are overlapped with each other. (Namely, the angle between the pair of legs 38 with respect to the center index-illuminating light sources 4A is determined.) Thus, the angle between the pair of legs 38 is determined so that the ends of the ranges L in the circumferential direction are overlapped with each other. Thereby, the light emitted to the opening where the index 20 is positioned is homogenized in the circumferential direction.

According to the above embodiment, the outer periphery 36 of the light shield 35' is provided with a round portion 39 of which distance from the outer periphery 31 of the concave 30 is longer as extended toward an end of the outer periphery 36. Therefore, the outer periphery 36 of the light shield 35' is so formed that a distance from the outer periphery 31 of the concave 30 is longer as extended toward an end of the outer periphery 36. Therefore, among the range L to which the index-illuminating light sources 4A is emitted, the amount of the light emitted to a position away from the index-illuminating light sources 4A is increased. Therefore, the amount of light emitted from the index-illuminating light sources 4A is further homogenized in the circumferential direction of the concave 30 at the outer periphery 31 of the concave 30, and the visibility of the meter 1 is further improved.

Further, the meter 1 further includes: a pair of legs 38 configured to connect the light shield 35' and the concave 30 and to reflect the light from the index-illuminating light sources 4A to the first or second inclined wall 3a, 3b. Further, the legs 38 are respectively projected outward from both ends of the outer periphery 36 of the light shield 35'. Therefore, the light from the index-illuminating light sources 4A is emitted within a range L of straight lines connecting the pair of legs 38 and the index-illuminating light sources 4A at the opening where the index 20 is positioned. Namely, the range L where the light from the index-illuminating light sources 4A is emitted is determined by an angle between the pair of legs 38 with respect to the center index-illuminating light sources 4A. Therefore, the range L where the light from the index-illuminating light sources 4A is emitted is determined by an easy operation of setting an angle between the pair of legs 38 with respect to the center index-illuminating light sources 4A.

Further, the legs 38 are so provided that the light from the index-illuminating light sources 4A is emitted to the range L of straight lines connecting the pair of legs 38 and the index-illuminating light sources 4A, and that the ranges L are overlapped with each other. Therefore, for example, ends in a circumferential direction of the range L where the amount of the light from the index-illuminating light sources 4A is reduced adjacent to each other are overlapped with each other. Thereby, the amount of the light emitted from the index-illuminating light sources 4A is further homogenized in a circumferential direction of the concave 30 at the outer periphery 31 of the concave 30 and the visibility of the meter 1 is further improved.

Incidentally, the above embodiment only shows a typical embodiment of the present invention, and the present invention is not limited to this. Namely, the present invention can be modified within a scope of the present invention.

[Reference Signs List]
1, 1' meter (instrumental device)
2 dial plate
20 index
3, 3' case
3a first inclined wall
3b second inclined wall
30 concave
31 outer periphery of concave
35, 35' light shield
36 outer periphery of light shield
37 inner periphery of light shield
38 leg
39 round portion
4A index-illuminating light source (light source)

The invention claimed is:

1. An instrumental device comprising:
a dial plate formed in a circular plate shape, and on which indexes indicating a condition of a mobile object are arranged in a circumferential direction of the dial plate;
a case provided with a concave formed in a concave groove shape along the indexes, and to which the dial plate is attached so as to cover an opening of the concave; and
a light source provided on a rear side of the dial plate in the concave, opposite to the index, and emitting light toward the index,
wherein the case is provided with a light shield interposed between the index and the light source and facing the light source,
wherein at least a part of an outer periphery of the light shield is formed in an arc shape so that a distance from an outer periphery of the concave is constant, and
wherein an inner peripheral wall of the concave is provided with a first inclined wall inclined in a direction approaching the dial plate as extended outward, and a second inclined wall inclined in a direction approaching the dial plate as extended inward.

2. The instrumental device as claimed in claim 1,
wherein the index is positioned at an outside or an inside of the opening,
wherein the inner peripheral wall of the concave is so provided as to reflect light from the light source,
and
wherein an inclination of one wall provided with the index of the first and second inclined walls is formed smaller than an inclination of the other wall away from the index.

3. The instrumental device as claimed in claim 1, wherein an inner periphery of the light shield is formed in an arc shape projecting outward.

4. The instrumental device as claimed claim 2, wherein an inner periphery of the light shield is formed in an arc shape projecting outward.

5. The instrumental device as claimed in claim 1, wherein the outer periphery of the light shield is provided with a round portion of which distance from the light source becomes longer as being away from a center portion of the outer periphery of the light shield toward an end of the outer periphery of the light shield.

6. The instrumental device as claimed in claim 2, wherein the outer periphery of the light shield is provided with a round portion of which distance from the light source becomes longer as being away from a center portion of the outer periphery of the light shield toward an end of the outer periphery of the light shield.

7. The instrumental device as claimed in claim 3, wherein the outer periphery of the light shield is provided with a round portion of which distance from the light source becomes longer as being away from a center portion of the outer periphery of the light shield toward an end of the outer periphery of the light shield.

8. The instrumental device as claimed in claim 4, wherein the outer periphery of the light shield is provided with a round portion of which distance from the light source becomes longer as being away from a center portion of the outer periphery of the light shield toward an end of the outer periphery of the light shield.

9. The instrumental device as claimed in claim 2, further comprising:
   a pair of legs configured to connect the light shield and the concave and to reflect the light from the light source to the first or second inclined wall, said legs respectively projected outward from both ends of the outer periphery of the light shield.

10. The instrumental device as claimed in claim 3, further comprising:
    a pair of legs configured to connect the light shield and the concave and to reflect the light from the light source to the first or second inclined wall, said legs respectively projected outward from both ends of the outer periphery of the light shield.

11. The instrumental device as claimed in claim 4, further comprising:
    a pair of legs configured to connect the light shield and the concave and to reflect the light from the light source to the first or second inclined wall, said legs respectively projected outward from both ends of the outer periphery of the light shield.

12. The instrumental device as claimed in claim 5, further comprising:
    a pair of legs configured to connect the light shield and the concave and to reflect the light from the light source to the first or second inclined wall, said legs respectively projected outward from both ends of the outer periphery of the light shield.

13. The instrumental device as claimed in claim 6, further comprising:
    a pair of legs configured to connect the light shield and the concave and to reflect the light from the light source to the first or second inclined wall, said legs respectively projected outward from both ends of the outer periphery of the light shield.

14. The instrumental device as claimed in claim 7, further comprising:
    a pair of legs configured to connect the light shield and the concave and to reflect the light from the light source to the first or second inclined wall, said legs respectively projected outward from both ends of the outer periphery of the light shield.

15. The instrumental device as claimed in claim 8, further comprising:
    a pair of legs configured to connect the light shield and the concave and to reflect the light from the light source to the first or second inclined wall, said legs respectively projected outward from both ends of the outer periphery of the light shield.

\* \* \* \* \*